United States Patent
Ye et al.

(10) Patent No.: US 10,783,406 B1
(45) Date of Patent: Sep. 22, 2020

(54) METHOD FOR DETECTING STRUCTURAL SURFACE CRACKS BASED ON IMAGE FEATURES AND BAYESIAN DATA FUSION

(71) Applicant: Zhejiang University, Hangzhou, Zhejiang (CN)

(72) Inventors: Xiaowei Ye, Zhejiang (CN); Tao Jin, Zhejiang (CN); Pengyu Chen, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 16/858,644

(22) Filed: Apr. 26, 2020

(30) Foreign Application Priority Data

Apr. 26, 2019 (CN) .......................... 2019 1 0342409

(51) Int. Cl.
*G06K 9/62* (2006.01)
*G06T 7/00* (2017.01)

(52) U.S. Cl.
CPC ......... *G06K 9/6278* (2013.01); *G06K 9/6256* (2013.01); *G06K 9/6269* (2013.01); *G06T 7/001* (2013.01); *G06T 2207/10016* (2013.01); *G06T 2207/20081* (2013.01); *G06T 2207/20084* (2013.01)

(58) Field of Classification Search
CPC ....... G01N 2021/8887; G01N 21/8803; G06K 2009/3291; G06K 2009/4666; G06K 9/00744; G06K 9/6278; G06N 20/00; G06N 3/0454; G06N 7/005; G06T 2207/10016; G06T 2207/20081; G06T 2207/20084; G06T 2207/30132; G06T 7/0004; G06T 7/33; G06T 7/04
See application file for complete search history.

(56) References Cited

U.S. PATENT DOCUMENTS

2014/0095426 A1*  4/2014  Nicholson ............... G06N 20/00
                                                                706/52
2017/0343481 A1* 11/2017  Jahanshahi ........... G06T 7/0004

FOREIGN PATENT DOCUMENTS

| CN | 103903268 A | 7/2014 |
| CN | 104598881 A | 5/2015 |
| CN | 105335725 A | 2/2016 |
| CN | 106951921 A | 7/2017 |
| CN | 108062564 A | 5/2018 |
| CN | 109376773 A | 2/2019 |
| WO | 2018002861 A1 | 1/2018 |

\* cited by examiner

*Primary Examiner* — Ross Varndell
(74) *Attorney, Agent, or Firm* — Wayne & Ken, LLC; Tony Hom

(57) ABSTRACT

A method for detecting structural surface cracks based on image features, support vector machines and Bayesian data fusion, including: 1) acquisition of a video of a structural surface and establishment of an image library; 2) calculation of texture features of the image frames by local binary patterns; 3) scanning and grouping for image patches of cracks on the image frames using two-stage support vector machine; 4) Bayesian data fusion and decision. The video image detection acquires images of many areas where human beings are difficult to reach; computers are adopted to identify cracks on surfaces of the structural elements, which can greatly reduce the identification workload and labor cost, and increase the crack detection rate. The invention has a better adaptability to the light strength on the structural surface, thus providing better identification for cracks.

1 Claim, 1 Drawing Sheet

10,783,406 B1

METHOD FOR DETECTING STRUCTURAL SURFACE CRACKS BASED ON IMAGE FEATURES AND BAYESIAN DATA FUSION

CROSS-REFERENCE TO RELATED APPLICATION

This application claims the benefit of priority from Chinese Patent Application No. 201910342409.4, filed on Apr. 26, 2019. The content of the aforementioned application, including any intervening amendments thereto, is incorporated herein by reference in its entirety.

TECHNICAL FIELD

This application relates to a method for detecting on structural surface cracks.

BACKGROUND OF THE INVENTION

Structural elements, such as steel structures, are one of the significant elements in infrastructures. As the service time grows, due to lack of periodic detection and subsequent maintenance, degradation will be inevitably caused by long-term usage, overloading, material aging and so on. Structural aging problems, such as cracks, fatigue, material embrittlement, abrasion and erosion, will cause loss of function and safety problems. Moreover, the structural elements are easily damaged under high temperature, high pressure, high radiation and acid or alkaline environments. Therefore, it is significant to detect the structural elements to slow down the element degradation and to enhance the structural safety.

For the structural elements, cracks are one of the significant defects in detection, because cracks will not only reduce the whole structural intensity, but also cause other problems such as corrosion. Currently, manual work is always employed in normal detection on site, in which a large number of structural elements are detected using naked eyes or portable tools, which is time-consuming and labor-consuming. Moreover, the detection process is monotonous; missing detection is easy to be caused; and defects cannot be effectively and timely observed. In addition, the high temperature, high pressure and acid or alkaline environments will bring certain risks to detecting personnel. In some special environments, the detection is carried out by manual judgement after video acquisition using cameras. Compared with the manual detection on site, this method is improved to reduce the risks of the detecting personnel. However, the structural cracks are generally small; the structural surface has a low contrast; and structures, such as scratches and welding seams, which are similar to the cracks, exist on the structural surface. Therefore, it is difficult for the detecting personnel to observe early and smaller cracks using naked eyes. There is a large luminance difference between surfaces of different structural elements and an unobvious contrast between the cracks and the surrounding area, and thus the processing algorithm for gray images is not applicable for this problem. Therefore, the existing image-based algorithms will result in higher false positive and negative rates during the detection of surface cracks.

Local binary pattern is a feature for identifying textures and characters and is irrelevant to illuminance, which can be used to effectively separate cracks from other textures such as scratches and welding seams. Support vector machine is an efficient tool for judging the type of input data. Bayesian decision theory is widely used in structural system identification and modelling, motion prediction, defect evaluation and safety analysis of infrastructures. A combination of the above-mentioned three methods is a better solution to the problems in the prior art, such as crack classification, so that the structural surface cracks can be better identified.

SUMMARY OF THE INVENTION

To overcome the defects of detection methods for structural surface cracks in the prior art, the invention provides a method for detecting structural surface cracks based on image features, support vector machines and Bayesian data fusion.

The invention is achieved by adopting the following technical solutions.

Firstly, a video of a structural surface is acquired, and image frames in every second are extracted to establish an image library. Secondly, crack-free images are removed among the image frames using two-stage support vector machine. Thirdly, the Bayesian data fusion is used to track an identified image containing cracks in nearby image frames. Finally, the crack is determined to be whether an actual crack using the Bayesian decision theory.

The invention provides a method for detecting structural surface cracks based on image features, support vector machines and Bayesian data fusion, comprising:

1) acquisition of a video of a structural surface and establishment of an image library 1a) selecting a target structural element, and acquiring the video of a surface of the target structural element using a video camera;

wherein when scanning the surface of the target structural element, the video camera moves at a constant speed, and a gentle lighting condition is selected to avoid intense reflection;

1b) selecting an interval according to general features of the target structural element, acquiring image frames of the surface of the target structural element frame by frame to establish the image library;

2) calculation of texture features of the image frames by local binary patterns 2a) scanning a local patch of each of the image frames; determining scan patches according to sizes of the image frames;

2b) calculating an integral local binary value of each of the scan patches of the image frames;

3) scanning and grouping for image patches of cracks on the image frames using two-stage support vector machine 3a) training a support vector machine neural network of a linear kernel and a support vector machine neural network of a radial basis function kernel using a training image library which contains training images comprising crack-containing images and crack-free images; wherein the training images in the training image library need to be predefined, and contain images similar to the image frames of the surface of the target structural element under different orientations and light conditions;

3b) treating the scan patches in step 2 with the support vector machine neural network of the linear kernel to remove crack-free images; wherein the support vector machine neural network of the linear kernel has a fast scan speed, but has a false positive rate; this step retains all the crack-containing images and a small amount of crack-free images within the false positive rate;

3c) scanning the retained images in step 3b one by one using the support vector machine neural network of the radial basis function kernel to remove the crack-free images;

wherein after step 3b, most of the crack-free images have been removed; however there is still a certain false positive rate; due to a high accuracy of the support vector machine neural network of the radial basis function kernel, the retained crack-free images are greatly removed;

3d) grouping the crack-containing image patches; wherein after the two-stage the support vector machine neural network, most of the retained images have cracks, while an image of a crack is generally larger than the scan patch, and thus nearby crack-containing image patches may be image patches containing the same crack; the crack-containing image patches within a certain distance are assumed to contain the same crack and are grouped to generate an actual boundary for the crack; and repeating steps 2-3 to treat each of the image frames to retain the crack-containing images;

4) Bayesian data fusion and decision 4a) carrying out Bayesian data fusion; wherein after step 3, a crack library in terms of frame is generated; since cracks in different image frames may belong to the same crack, a crack boundary is tracked in nearby image frames; during the tracking, the largest image boundary is used to match image boundaries of the nearby image frames until the largest image boundary moves out of one image frame; when a matching degree of boundaries reaches a certain threshold, the boundaries are determined to belong to the same crack; and bounding box sets corresponding to the same crack are generated;

4b) carrying out Bayesian decision; wherein after step 4a, the bounding box sets corresponding to the same crack are classified; the crack is determined whether to be an actual crack according to the Bayesian decision, and further according to a probability threshold of whether the crack is tracked in nearby frames; and treating the image library step by step to obtain crack images.

Compared with the prior art, the present invention has the following beneficial effects.

Compared with a manual detection on site, the video image detection in this invention acquires images of many areas where human beings are hard to reach, which expends the detection range. In addition, the structural element can be detected under high temperature, high pressure, high radiation and acid or alkaline environments.

The method of the present invention adopts computers to identify cracks on surfaces of the structural elements. Compared with a manual identification of videos, the method of the present invention can greatly reduce the identification workload and labor cost, fasten the detection process, and increase the crack detection rate.

In this invention, the texture features of the crack areas are extracted by the local binary patterns, which has a better adaptability to the light strength on the structural surface, thus provides better identification for the textures than methods in the prior art, such as gray-scale map.

This invention is capable of identifying smaller structural surface cracks, providing an early warning for crack defects timely, observing a structural defect in advance, and leaving more time for a subsequent maintenance.

In this invention, the two-stage support vector machine neural network is adopted to scan the images; a support vector machine neural network of a linear kernel is used to maintain a faster scan speed, and then a support vector machine neural network of a radial basis function kernel is used to maintain a higher accuracy.

After the scanning of two-stage support vector machine, the Bayesian data fusion and decision are carried out to treat the retained crack-containing image, so that the accuracy of crack identification is further improved.

DETAILED DESCRIPTION OF EMBODIMENTS

Figure 1:
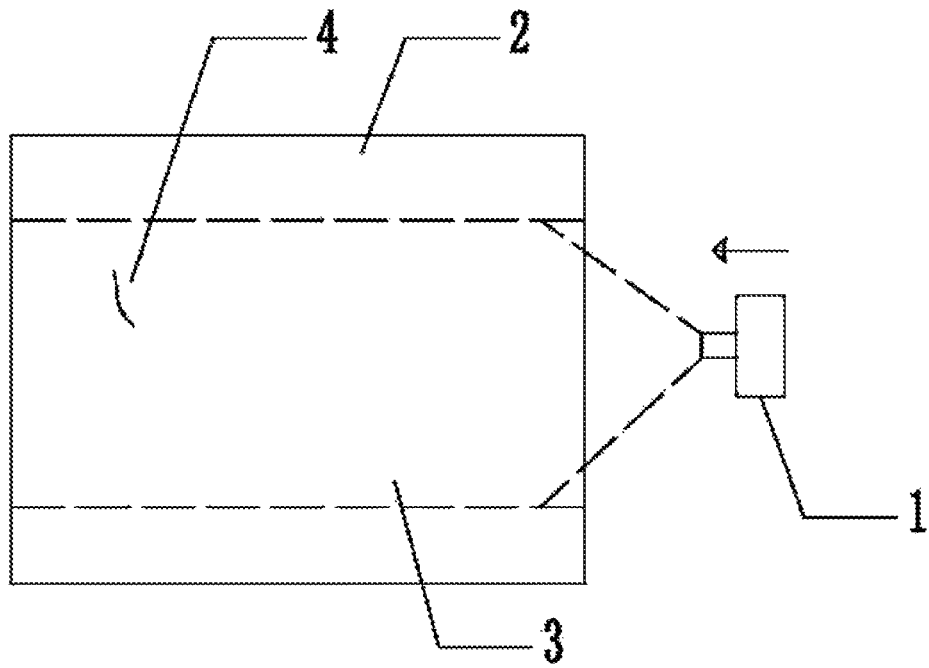
FIG. 1 schematically shows a video acquisition of a target structural surface for detecting structural surface cracks based on image features and Bayesian data fusion according to the present invention.
Figure 2:
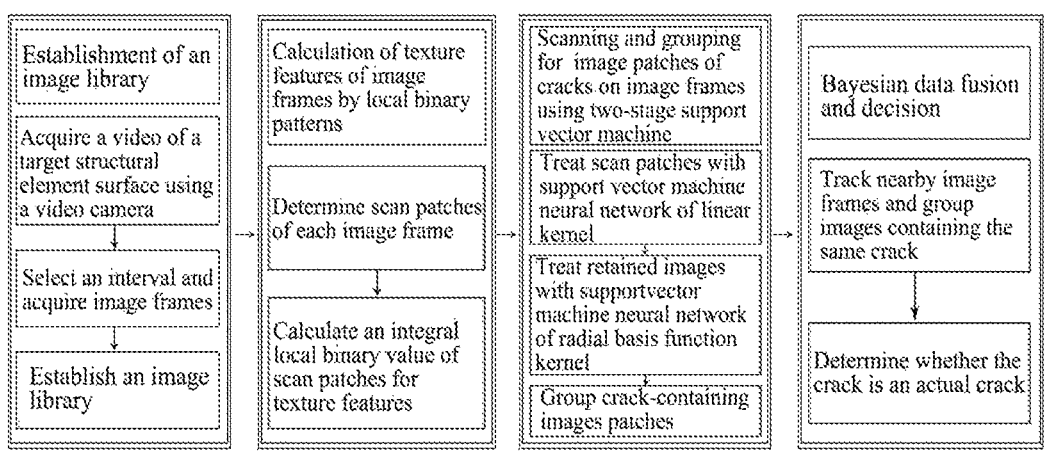
FIG. 2 is a flow chart of the method for detecting structural surface cracks according to the present invention.

The invention will be further described with reference to the accompanying drawings. It should be noted that during the structural surface video acquisition, an intense reflection should be avoided on a structural surface.

The invention provides a method for detecting structural surface cracks based on image features, support vector machines and Bayesian data fusion, including the following steps.

1) Acquisition of a video of a structural surface and establishment of an image library 1a) A target structural element 2 is selected, and the video of a surface of the target structural element 2 is acquired using a video camera 1. When scanning the surface 3 of the target structural element 2, the video camera 1 moves at a constant speed, and a gentle lighting condition is selected to avoid intense reflection.

1b) An interval is selected according to general features of the target structural element 2, image frames of the surface 3 of the target structural element 2 are acquired frame by frame to establish the image library.

2) Calculation of texture features of the image frames by local binary patterns

2a) A local patch of each of the image frames is scanned. Scan patches are determined according to sizes of the image frames.

2b) An integral local binary value of each of the scan patches of the image frames is calculated.

3) Scanning and grouping for image patches of cracks 4 on the image frames using two-stage support vector machine 3a) A support vector machine neural network of a linear kernel and a support vector machine neural network of a radial basis function kernel are trained using a training image library which contains training images including crack-containing images and crack-free images. The training images in the training image library need to be predefined, and contain images similar to the image frames of the surface 3 of the target structural element 2 under different orientations and light conditions.

3b) The scan patches in step 2 are treated with the support vector machine neural network of the linear kernel to remove crack-free images. The support vector machine neural network of the linear kernel has a fast scan speed, but has a false positive rate. This step retains all the crack-containing images and a small amount of crack-free images within the false positive rate.

3c) The retained images in step 3b are scanned one by one using the support vector machine neural network of the radial basis function kernel to remove the crack-free images. After step 3b, most of the crack-free images have been removed. However, there is still a certain false positive rate. Due to a high accuracy of the support vector machine neural network of the radial basis function kernel, the retained crack-free images are greatly removed.

3d) The crack-containing image patches are grouped. After the two-stage the support vector machine neural network, most of the retained images have cracks 4, while an image of a crack is generally larger than the scan patch, and thus nearby crack-containing image patches may be image patches containing the same crack 4. The crack-containing patches within a certain distance are assumed to contain the same crack 4 and are grouped to generate an actual boundary for the crack 4. Steps 2-3 are repeated to treat each of the image frames to retain the crack-containing images.

4) Bayesian data fusion and decision

4a) Bayesian data fusion is carried out. After step 3, a crack library in terms of frame is generated. Since cracks 4 in different image frames may belong to the same crack 4, a crack boundary is tracked in nearby image frames. During the tracking, the largest image boundary is used to match image boundaries of the nearby image frames until the largest image boundary moves out of one image frame. When a matching degree of boundaries reaches a certain threshold, the boundaries are determined to belong to the same crack 4. Bounding box sets corresponding to the same crack 4 are generated.

4b) Bayesian decision is carried out. After step 4a, the bounding box sets corresponding to the same crack 4 are classified. The crack 4 is determined whether to be an actual crack according to the Bayesian decision, and further according to a probability threshold of whether the crack 4 is tracked in nearby frames. The image library is treated step by step to obtain crack images.

What is claimed is:

1. A method for detecting structural surface cracks based on image features, support vector machines and Bayesian data fusion, comprising:
   1) acquisition of a video of a structural surface and establishment of an image library
   1a) selecting a target structural element, and acquiring the video of a surface of the target structural element using a video camera;
   wherein when scanning the surface of the target structural element, the video camera moves at a constant speed, and a gentle lighting condition is selected to avoid intense reflection;
   1b) selecting an interval according to general features of the target structural element, acquiring image frames of the surface of the target structural element frame by frame to establish the image library;
   2) calculation of texture features of the image frames by local binary patterns
   2a) scanning a local patch of each of the image frames; determining scan patches according to sizes of the image frames;
   2b) calculating an integral local binary value of each of the scan patches of the image frames;
   3) scanning and grouping for image patches of cracks on the image frames using two-stage support vector machine
   3a) training a support vector machine neural network of a linear kernel and a support vector machine neural network of a radial basis function kernel using a training image library which contains training images comprising crack-containing images and crack-free images; wherein the training images in the training image library need to be predefined, and contain images similar to the image frames of the surface of the target structural element under different orientations and light conditions;
   3b) treating the scan patches in step 2 with the support vector machine neural network of the linear kernel to remove crack-free images; wherein the support vector machine neural network of the linear kernel has a fast scan speed, but has a false positive rate; this step retains all the crack-containing images and a small amount of crack-free images within the false positive rate;
   3c) scanning the retained images in step 3b one by one using the support vector machine neural network of the radial basis function kernel to remove the crack-free images; wherein after step 3b, most of the crack-free images have been removed; however there is still a certain false positive rate; due to a high accuracy of the support vector machine neural network of the radial basis function kernel, the retained crack-free images are greatly removed;
   3d) grouping the crack-containing image patches; wherein after the two-stage the support vector machine neural network, most of the retained images have cracks, while an image of a crack is generally larger than the scan patch, and thus nearby crack-containing image patches may be image patches containing the same crack; the crack-containing patches within a certain distance are assumed to contain the same crack and are grouped to generate an actual boundary for the crack; and
   repeating steps 2-3 to treat each of the image frames to retain the crack-containing images;
   4) Bayesian data fusion and decision
   4a) carrying out Bayesian data fusion; wherein after step 3, a crack library in terms of frame is generated; since cracks in different image frames may belong to the same crack, a crack boundary is tracked in nearby image frames; during the tracking, the largest image boundary is used to match image boundaries of the nearby image frames until the largest image boundary moves out of one image frame; when a matching degree of boundaries reaches a certain threshold, the boundaries are determined to belong to the same crack; and bounding box sets corresponding to the same crack are generated;
   4b) carrying out Bayesian decision; wherein after step 4a, the bounding box sets corresponding to the same crack are classified; the crack is determined whether to be an actual crack according to the Bayesian decision, and further according to a probability threshold of whether the crack is tracked in nearby frames; and treating the image library step by step to obtain crack images.

* * * * *